United States Patent [19]

Bouiller et al.

[11] Patent Number: 4,521,160

[45] Date of Patent: Jun. 4, 1985

[54] ROTORS OF ROTATING MACHINES

[75] Inventors: Jean G. Bouiller, Brunoy; Marcel R. Soligny, Chevilly-Larue, both of France

[73] Assignee: Societe Nationale d'Etude et de Construction de Moteurs d'Aviation, France

[21] Appl. No.: 529,938

[22] Filed: Sep. 8, 1983

Related U.S. Application Data

[63] Continuation of Ser. No. 358,865, Mar. 17, 1982, abandoned, which is a continuation of Ser. No. 116,528, Feb. 1, 1980, abandoned.

[30] Foreign Application Priority Data

Feb. 8, 1979 [FR] France ................. 79 03191

[51] Int. Cl.³ .................................... F01D 5/06
[52] U.S. Cl. ................... 416/218; 416/244 A
[58] Field of Search .......... 416/218 R, 218 A, 244 A, 416/146 R, 2, 220 R, 220 A; 415/9

[56] References Cited

U.S. PATENT DOCUMENTS 3,554,668  1/1971  Wagle ............................. 416/244 A
3,610,772 10/1971  Wagle ............................. 416/218 X

FOREIGN PATENT DOCUMENTS 1296310 11/1972 United Kingdom ................ 416/218
 507729  4/1976 U.S.S.R. ................................ 74/572

Primary Examiner—Henry C. Yuen
Assistant Examiner—John Kwon
Attorney, Agent, or Firm—Bacon & Thomas

[57] ABSTRACT

Device for the containment of fragments of a fan ring in the event of bursting of the ring.

The fan ring comprises two cylindrical surfaces spaced axially and located radially inside of two containment rings of high tensile strength in the circumferential direction, engaged respectively in grooves of two parts of the rotor, located on either side of the fan ring.

13 Claims, 1 Drawing Figure

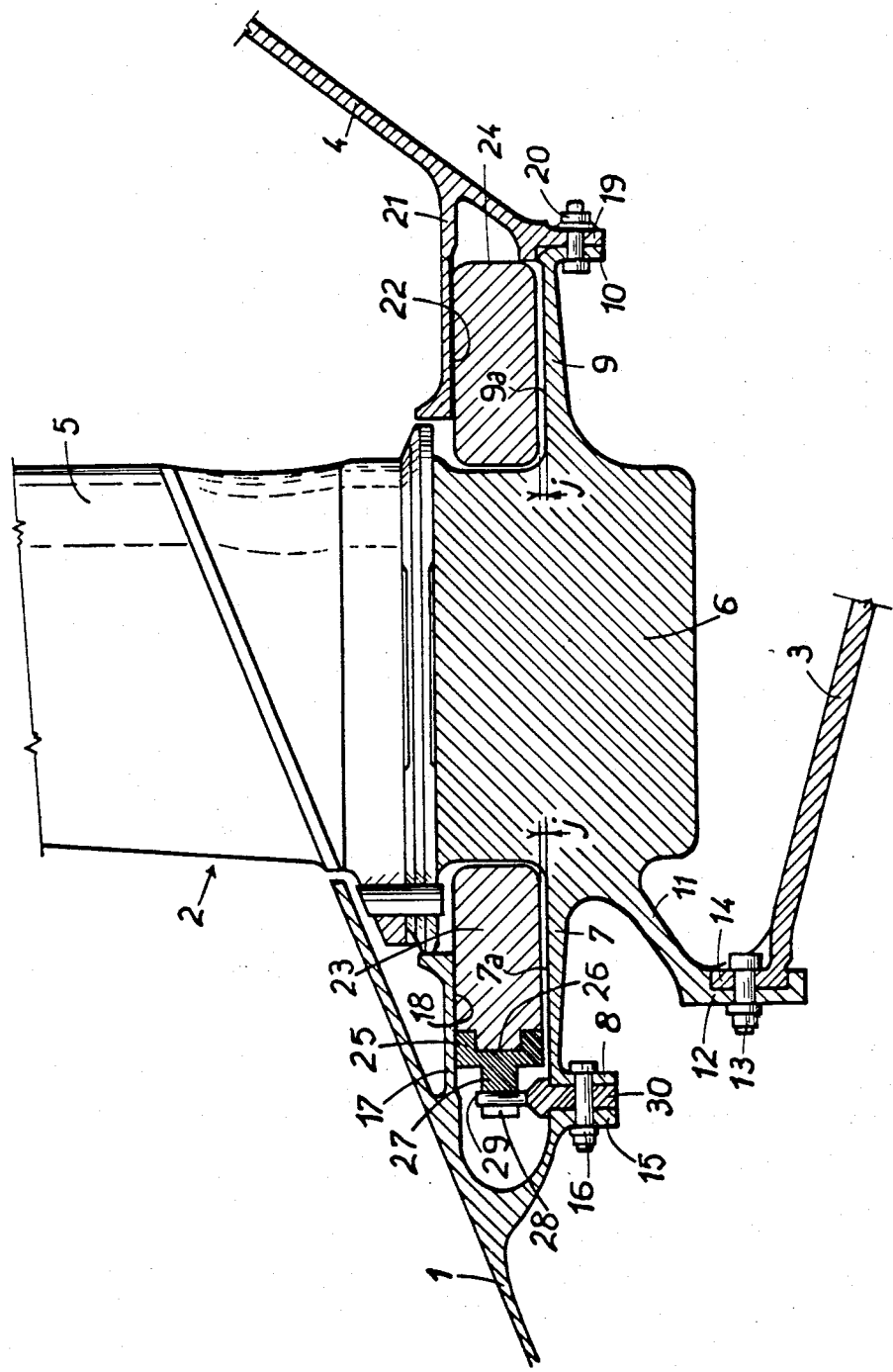

ROTORS OF ROTATING MACHINES

This is a continuation of application Ser. No. 358,865, filed Mar. 17, 1982, now abandoned, which is a continuation of application Ser. No. 116,528 filed Feb. 1, 1980, now abandoned.

BACKGROUND OF THE INVENTION

The invention concerns an improvement in the rotors of rotating machines. It applies particularly to jet engines and other aeronautical turbine machines.

The bursting of disks or rings of a motor rotor constitutes the most severe failure that may occur on board an aircraft. In most such cases the fragments of the disk or ring penetrate through the housing containing the rotor; if these fragments damage elements such fuel controls or lines, such an incident may lead to the loss of the aircraft. It has already been proposed to protect the passengers and the vital organs of the aircraft by placing armor plates around the rotors capable of containing the fragments in case of the bursting of the rotor. These plates have the disadvantage that they considerably increase the weight of the aircraft, and manifest a mediocre efficiency in engines of recent design, the rotors whereof have large diameters and rotate at high velocities.

SUMMARY OF THE INVENTION

It is the object of the present invention to provide a device capable of effectively containing the fragments of a rotor in the case of the bursting of said rotor and consequently to prevent the release of the kinetic energy of the fragments without requiring a reinforcement of the housing.

According to the present invention, the disk or element of the rotor susceptible to bursting comprises two annular surfaces spaced axially, of and located radially within two containment rings and having high tensile strengths in the circumferential direction, said rings being attached respectively to two pieces of the rotor located on either side of said disk or element.

In the case of bursting of the disk element of the rotor under the action of centrifugal forces, the fragments are contained radially by two rings. A slight radial clearance, possibly amounting to several millimeters, is preferably provided between the annular surfaces and the containment rings, and the latter are preferably forced with a slight friction in bores of the pieces of the rotor.

In the case wherein the element of the rotor comprises an annular part, such as that of a turbine disk or a fan or compressor ring, carrying at its periphery a plurality of organs disposed in the form of a crown such as the blades of a turbine, a fan or a compressor, the annular surfaces are normally integral with said annular part.

BRIEF DESCRIPTION OF THE DRAWING

The description to follow hereinafter, with reference to the drawing attached hereto will provide a better understanding of the advantages of the invention and the art of realizing it; it should further be understood that all particulars issuing both from the text and the drawing are part of said invention.

The single FIGURE is a view in an axial semisection of a portion of the rotor of an aircraft jet engine comprising a fan disk.

DESCRIPTION OF A PREFERRED EMBODIMENT

The rotor represented partially in the drawing comprises, from front to rear, a front hood, the rear portion thereof being shown at 1, a fan wheel 2 mounted on the hood 1 and on the front end of a hollow shaft, a part thereof being shown at 3, a compressor rotor comprising blades not shown, mounted on the periphery of a drum the front portion of which is seen at 4, is secured to the wheel of the fan 2, and a turbine rotor, not shown, is mounted on the rear end of the shaft 3.

The wheel of the fan 2 comprises a row of blades 5 mounted on the periphery of a fan wheel 6 provided at its front with an annular extension with a cylindrical external surface 7a, carrying at its front end a flange 8, and in the rear, with a second annular extension 9 with an external cylindrical surface 9a, carrying on its rear end a flange 10. The fan wheel 6 is further provided, at its front, with a third annular extension 11 forming at its front end a flange 12, secured, for example, by means of bolts shown schematically at 13, to a flange 14 formed at the front end of the hollow shaft 3.

The hood 1 is provided, at its rear, with a flange 15 secured by means of the bolts shown schematically at 16, to the flange 8 of the fan ring, and with a lip 17 having a surface 18, surrounding the surface 7a at a certain radial distance from it. Similarly, the compressor drum 4 is provided, at its front, with a flange 19 secured by the bolts 20 to the flange 10 of the fan ring and a lip 21 with inner surface 22 surrounding the surface 9a at a certain radial distance from said surface.

In the spaces inwardly of the cylindrical surfaces 18 and 22, there are engaged respectively, with slight friction, two containment rings 23 and 24, each made of several layers of boron wire wound helically, embeded in an aluminum matrix by the process described in French Application No. 74 36209 of the present applicant (Publication No. 2 289 425). The containment rings 23 and 24 have radial thicknesses such that a clearance j of the order of millimeters is maintained between them and the corresponding cylindrical surface 7a or 9a.

Means securing the rings 23 and 24 to the rotor are provided in order to prevent rotation of said rings relative to wheel 6, in spite of the clearance provided.

On the left part of the drawing, an example of such means is shown for holding the wound containment rings against relative rotation. A U-shaped flange 25, adhesively bonded or brazed to the front surface 26 of the ring 23, has a series of projections 27 reqularly spaced about its circumference. Each projection 27 has a radial slot 28 in which a finger 29 carried by a flange 30 engages. The flange 30 is held and bolted between the flanges 15 of the front fairing and 8 of the disk.

The embodiment illustrated in the left part of the FIGURE is presented as an example only, it being possible, alternatively, to adhesively bond or braze the ring 23 directly onto the surface 18 of the flange 17.

In the case of bursting, under the action of centrifugal forces, of the fan ring 6 while rotating rapidly, the portions of the surfaces 7a and 9a of each fragment will bear respectively against the containment rings 23 and 24, which absorb the kinetic energy of the fragments and contain them, thus preventing their destruction of the housing (not shown), which surrounds the fan and which will then contain only the blades 5 released by the burst.

It should be noted that even though they are obtained by the process of making hoops described in the above-cited French patent, the containment rings 23 and 24 are not hoops. The role of a hoop is in effect to prevent or retard bursting. When the extension 7 and 9 are surrounded by hoops, the bursting of the fan ring 6 is thereby retarded but it will occur nevertheless at a certain velocity. In contrast, in the device according to the present invention, the fragments of the burst fan ring travel through the radial distance j and are blocked by the containment rings 23 and 24. In other words, the containment rings do not participate in the balancing of the centrifugal forces acting on the blades; their function is to insure the containment of large fragments of the fan ring in case one or several cracks originating in the recess of said ring reach its periphery.

The rings 23 and 24 accomplish the blockage and containment of the fragments by virtue of their high tension strength in the circumferential direction, said tensile strength, in the embodiment described hereinabove, being obtained by the process of the above-cited French patent. In other embodiments, the boron filaments may be replaced by filaments of other high tensile strength materials, for example silicon carbide or steel, and the embedding forming the matrix may consist of a material other than aluminum, for example a light alloy or an epoxy resin. The rings may further be made of a steel, for example a steel of (French) grade Z 2 NKDT 18, within the scope of the invention.

In such a case the means for securing the containment rings to the rotor may comprise projections similar to the projections 27 of the FIGURE, but machined directly into the mass of the ring.

The mounting of the fan wheel is effected in the following manner.

In the example, with the means of fastening using a flange with projections, installation begins with the mounting of the ring 24. For this purpose, the projections of the rear flange having projections are placed into the forks of the U-shaped flange adhesively bonded or brazed on the downstream face of the ring 24, and the assembly of the ring 24 plus the flange with projections, is placed so as to fit the ring 24 in the bore 22, then the flange with projections is tightened and bolted between the flange 10 of the fan wheel and the flange 19 of the drum 4 by means of the bolt 20. The flange 12 is then secured to the fan wheel on the flange 14 of the low pressure shaft by means of the bolts 13.

In continuing the assembly, at the front side of the fairing, the flange 30 equipped with its projections, is placed against the flange 25 bonded to the ring 23, so that each radial slot 28 receives a projection 29 of the flange 30. The assembly is now locked so that the ring 23 is mounted in the space inwardly of cylindrical surface 18. The flange 30 is then tightened and bolted by means of the bolts 16 between the flanges 15 of the front fairing and 8 of the fan disk.

The forward part of the fairing is then secured to the fairing 1 by means of screws (not shown).

In the variant wherein the rings are brazed directly onto the surfaces 18 and 22, the assembly operation is simplified and brazing is effected in a furnace.

It is obvious that the embodiments described hereinabove are only examples and that they may be modified, particularly by the substitution of equivalent techniques, within the scope of the invention. The applications of the invention are not limited to fan rings. It may be applied to the disk of a turbine or any other element of a rotor rotating at high velocities, for example a fly-wheel.

We claim:

1. In a turbine apparatus having a fan wheel with a plurality of turbine blades attached about its outer periphery, an upstream structure attached to one side of the fan wheel and a downstream structure attached to the other side of the fan wheel, the improved device for containing fragments of the fan wheel in case of bursting comprising: (a) a first annular extension formed on the one side of the fan wheel defining a first external cylindrical surface; (b) a second annular extension formed on the other side of the fan wheel defining a second external cylindrical surface; (c) a first containment ring having high tensile strength in the circumferential direction disposed coaxially about the first annular extension, the first containment ring being disposed radially outwardly of the first external cylindrical surface so as to define a circumferentially open space therebetween; (d) first means to attach the first containment ring and the fan wheel to the upstream structure to prevent relative rotation therebetween; (e) a second containment ring having high tensile strength in the circumferential direction disposed coaxially about the second annular extension, the second containment ring being disposed radially outwardly of the second external cylindrical surface so as to define a circumferentially open space therebetween; and (f) second means to attach the second containment ring and the fan wheel to the downstream structure to prevent relative rotation therebetween.

2. The improved containment device according to claim 1, wherein the first attachment means comprises: (a) a first annular flange attached to an upstream side of the first containment ring, the first annular flange having a plurality of projections, each projection defining a radial slot; and, (b) at least one radially extending finger attached to the upstream structure and engaging at least one of the radial slots.

3. The improved containment device according to claim 2 wherein the second attachment means comprises: (a) a second annular flange attached to the downstream side of the second containment ring, the second annular flange having a plurality of projections, each projection defining a radial slot; and, (b) at least one radially extending finger attached to the downstream structure and engaging at least one of the radial slots.

4. The improved containment device according to claim 3 wherein the first and second annular flanges each have a generally "U"-shaped cross-section and are brazed to the containment rings.

5. The improved containment device according to claim 3 wherein the first and second annular flanges each have a generally "U"-shaped cross-section are adhesively bonded to the containment rings.

6. The improved containment device according to claim 1 further comprising: (a) a first lip attached to the upstream structure and extending parallel to the first annular extension so as to define a first annular space therebetween; and, (b) a second lip attached to the downstream structure and extending parallel to the second annular extension so as to define a second annular space therebetween, the first and second containment rings being disposed within the first and second annular spaces, respectively.

7. The improved containment device according to claim 1 wherein each of the containment rings is made of a composite material comprising filaments of a high tensile strength material embedded in a matrix material.

8. The improved containment device according to claim 7 wherein the filaments are boron.

9. The improved containment device according to claim 7 wherein the filaments are silicon carbide.

10. The improved containment device according to claim 7 wherein the filaments are steel.

11. The improved containment device according to claim 7 wherein the matrix material is aluminum.

12. The improved containment device according to claim 7 wherein the matrix material is an epoxy resin.

13. The improved containment device according to claim 1 wherein the first and second containment rings are made of high strength steel.

* * * * *

UNITED STATES PATENT AND TRADEMARK OFFICE
CERTIFICATE OF CORRECTION

PATENT NO. : 4,521,160
DATED : June 4, 1985
INVENTOR(S) : BOUILLER et al

It is certified that error appears in the above-identified patent and that said Letters Patent is hereby corrected as shown below:

Col. 2, line 5, change "hood" to -- fairing --;
      line 7, change "hood" to -- fairing --;
      line 15, after "extension", insert: -- 7 --;
      line 25, change "hood" to -- fairing --;
      line 36, change "embeded" to -- embedded --;

Col. 3, line 5, change "extension" to: -- extensions --;

Col. 1, line 17, after "such", insert: -- as --;

Claim 5, Col. 4, line 55, after "cross-section", insert: -- and --.

Signed and Sealed this

Fifteenth Day of October 1985

[SEAL]

Attest:

DONALD J. QUIGG

Attesting Officer

Commissioner of Patents and
Trademarks—Designate